United States Patent [19]

Kaptein

[11] Patent Number: 5,551,649
[45] Date of Patent: Sep. 3, 1996

[54] PROPELLER BLADE POSITION CONTROLLER

[75] Inventor: Dick Kaptein, Alphen A/D Rijn, Netherlands

[73] Assignee: Fokker Aircraft B.V., Schiphol, Netherlands

[21] Appl. No.: 184,752

[22] Filed: Jan. 18, 1994

Related U.S. Application Data

[63] Continuation-in-part of Ser. No. 866,563, Apr. 10, 1992, Pat. No. 5,295,641, which is a continuation of Ser. No. 600,445, Oct. 19, 1990, Pat. No. 5,150,855.

[30] Foreign Application Priority Data

Oct. 20, 1989 [GB] United Kingdom ............... 8923643

[51] Int. Cl.⁶ ........................................ B64D 31/12
[52] U.S. Cl. ................... 244/1 N; 416/33; 381/71; 364/508; 364/574
[58] Field of Search ............... 244/1 N, 118.5, 244/129.1; 416/33, 34, 50; 381/71; 181/206; 364/574, 508, 474.22, 431.01, 494; 415/119; 60/39.21, 281

[56] References Cited

U.S. PATENT DOCUMENTS

| | | | |
|---|---|---|---|
| 3,589,832 | 6/1971 | Harris | 416/34 |
| 3,689,175 | 9/1972 | Hartzell | 416/34 |
| 4,653,981 | 3/1987 | Harner et al. | 416/34 |
| 5,093,791 | 3/1992 | Schneider et al. | 416/34 |
| 5,148,402 | 9/1992 | Magliozzi et al. | 244/1 N |
| 5,221,185 | 6/1993 | Pla et al. | 244/1 N |

Primary Examiner—Galen L. Barefoot
Attorney, Agent, or Firm—Handal & Morofsky

[57] ABSTRACT

System for reducing vibrations in the cabin of an aircraft driven by two or more propellers each having n blades (n being an integer equal or larger than 2) of which the relative phase angle can be adjusted, said system comprising synchrophase means for adjusting said relative phase angle such that a predetermined relative phase angle is maintained. The system furthermore comprises means supplying information about the vibration level at one or more positions within the cabin or thereto related information and for generating a thereto corresponding level signal, and a control unit which in response to said level signal supplies an error signal to the synchrophase means causing the synchrophase means to adjust the blades of the various propellers such that a new relative phase angle is maintained which differs $m.(2\pi/n)$ radians (m being an integer) from the previous relative phase angle. Each propeller comprises at least one recognizing means attached to one of its propeller blades, the recognizing means being detectable by a sensor in order to establish the absolute position of the various propeller blades.

10 Claims, 4 Drawing Sheets

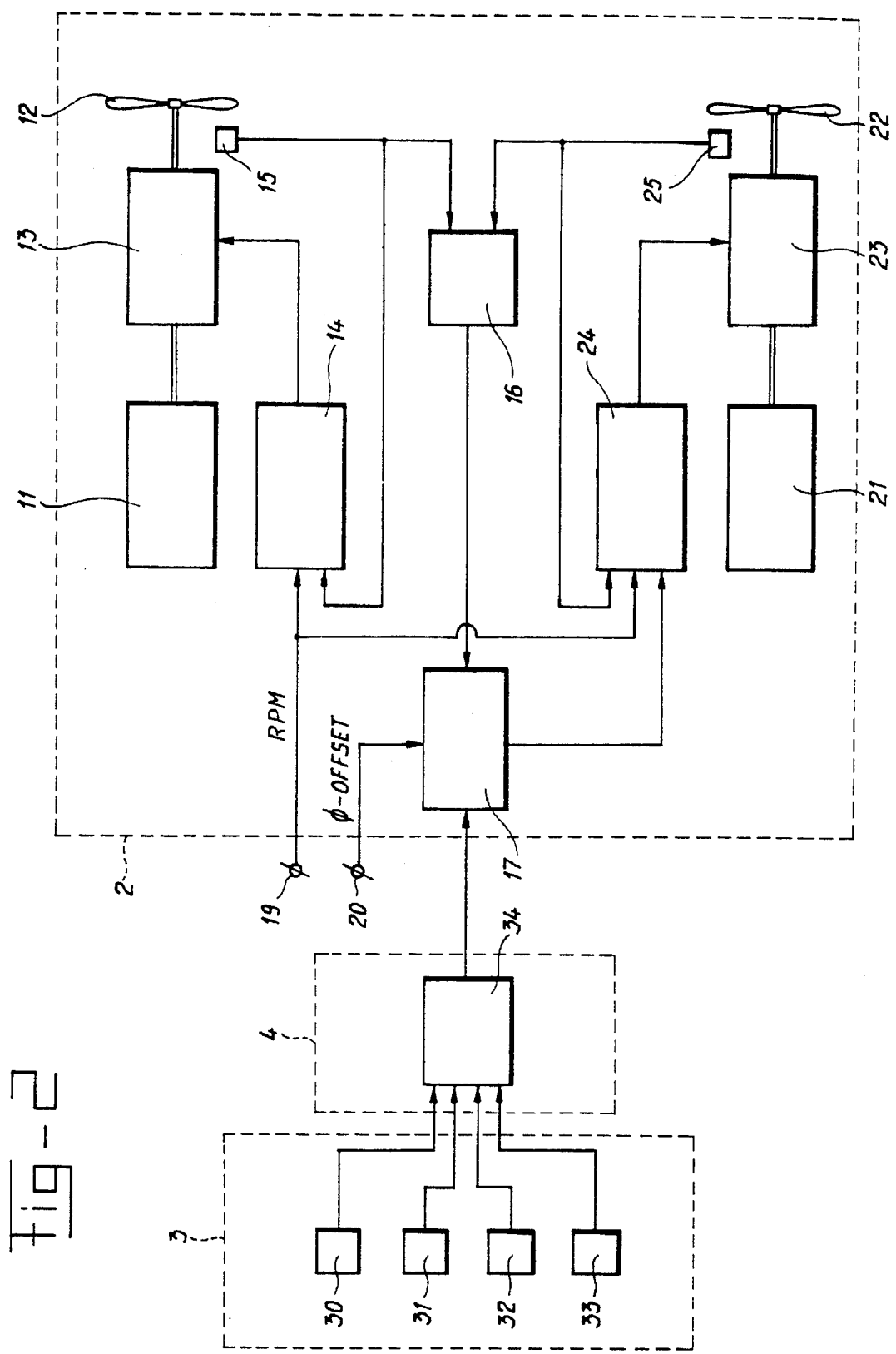

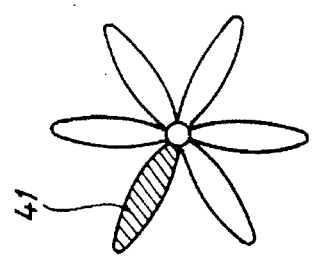
56
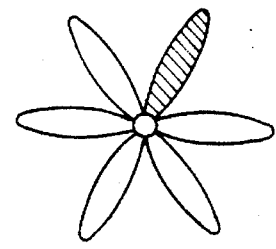
55
54
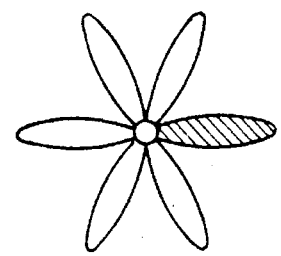
53
Fig-3
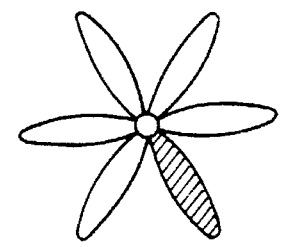
52
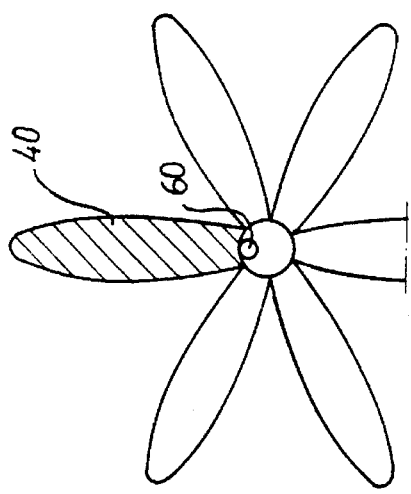
PROPELLER 12
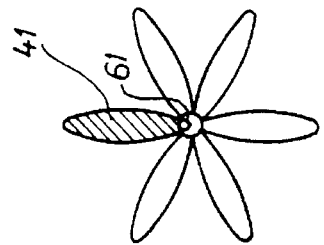
51
PROPELLER 22

PROPELLER BLADE POSITION CONTROLLER

CROSS-REFERENCE TO RELATED APPLICATIONS

This application is a continuation-in-part of U.S. patent application Ser. No. 07/866,563 of Kaptein filed Apr. 10, 1992 and entitled "PROPELLOR BLADE POSITION CONTROLLER", now U.S. Pat. No. 5,295,641, which, in turn, is a continuation of U.S. patent application Ser. No. 07/600,445 of Kaptein filed Oct. 19, 1990 and entitled "PROPELLOR BLADE POSITION CONTROLLER", now U.S. Pat. No. 5,150,855, issued Sep. 29, 1992.

BACKGROUND OF THE INVENTION

The invention relates to a system for reducing vibrations in the cabin of an aircraft driven by two or more propellers each having n blades (n being an integer equal or larger than 2), the relative phase angle of which may be adjusted, the system comprising at least synchrophase means for adjusting the relative phase angle such that a predetermined relative phase angle may be maintained;

vibration level detecting means to supply information about the vibration level at one or more positions within the cabin or information related thereto, and to generate a corresponding vibration level signal, and a control unit supplying an error signal to the synchrophase means in response to the vibration level signal causing the synchrophase means to adjust the predetermined relative phase angle to a new value causing a reduced vibration level.

Examples of such systems are given by U.S. Pat. Nos. 2,847,617; 2,877,855; 2,878,427; 3,007,529; 3,589,832; 4,245,955; 4,653,981; 4,659,283 and 4,703,908; European application EP 0,322,343; Canadian Patents 0,664,628 and 0,472,689 and the UK Patent 2,211,635. The object of these prior art systems for propeller synchrophasing is to maintain an accurate positional or phasic agreement between one blade of a first propeller, which is named the master, and any blade of the other propeller(s), which are named the slaves.

An other example of such a system is known from EP-0,252,647, which discloses an apparatus that may reduce cabin noise levels by continuously sensing during the flight the vibration level in the cabin and calculating therefrom the optimum phase relationship between the (master) propeller and at least one other (slave) propeller. The control unit supplies an error signal to a synchrophaser which adjusts the blades of the slave propeller(s) to a position of minimum vibration level starting from one specific begin phase relationship.

A source of discomfort for passengers and crew of propeller-driven aircraft is the action of the various engines and propellers generating annoying vibrations and dominant noise in the cabin and cockpit. A propeller with a rotational speed N and a number of blades n, generates excitation forces having frequencies of N Hz and nN Hz with harmonics. Vibrations of this nature have regular and irregular patterns. In order to reduce the vibration and internal noise to an appreciable level for crew and passengers, modern propeller driven multi-engined aircraft utilize all kind of energy absorbing, vibration isolating and reactive force devices to reduce the transmission of mechanical vibrations from the propulsion units to the fuselage.

For example, isolators are often mounted in the connection between engine and engine support to isolate the engine/propeller combination from objectionable dynamic foundation displacements, and/or isolate the aircraft structure from objectionable dynamic foundation displacement, and/or isolate the aircraft structure from objectionable dynamic forces from the engine/propeller combination. Such apparatus include elastomeric and metal spring elements for dampening vibration in one or more directions.

The complex factors determining the human response to vibrations and the paucity of consistent quantitative data concerning man's perception of vibration and his reactions to it, are difficult to translate in generally recognizable criteria of comfort or discomfort. However, when the intensity, frequency and duration of the vibration at several locations in the cabin, and also consequences of such vibrations like visible vibration of passenger seats or tables are judged by a variety of passengers in comfort or discomfort, acceptance criteria can be derived. From a survey of many aircraft an acceptable maximum level of the energy of the vibration at several locations in the cabin was established.

During first flights of Fokker 50 series aircraft, which is a twin engined propeller-driven passenger aircraft, it appeared that some of the aircraft would expose future passengers to uncomfortable vibrations. With the help of above mentioned acceptance criteria, the influence of modified vibration engine isolators was investigated. Also investigated was the influence of minimizing the propeller mass unbalance. Results of both investigations indicated that the vibration level could be reduced for the given new-built aircraft. However, after delivery of the aircraft to the operator maintenance of the aircraft would change the configuration, for example by the replacement of a propeller. Therefore the cause of vibrations and noise in the cabin which affect passenger comfort in a negative way, had to be solved more fundamentally.

A further reason to proceed investigations was the observation that despite modified isolators and minimized unbalance, during flight after an engine shut down and relight a period of sufficiently low energy level of vibrations before the shut-down was succeeded by a period with a higher level after the relight, and vice versa. Continued measurements during flight tests whereby the phase relationship between the two propellers of the aircraft was controlled by the propeller synchrophase system, showed a relation between the vibration level and the changes of the position of the blades of the starboard propeller with respect to the blades of the port propeller. From these observations distinctions in detail were made between the vibration and noise level in the cabin before and after the synchrophase system had readjusted upon a disturbance the required phase relationship between both propellers.

By measurements of the relation between the vibration levels in the cabin and the relative position of the blades of the right hand propeller versus the left hand propeller, it was found that when the position of a particular blade of one propeller and the position of a particular blade of the other propeller were synchrophased, the vibration level in the cabin showed a minimum. Also the contrary was measured, namely that a maximum vibration level could occur by synchrophasing two particular other blades. The findings were worked out in an add-on system of the prior art propeller synchrophase system to arrange that the add-on system in conjunction with the synchrophase system selects automatically the pair of blades from the propellers of the aircraft that gives the minimum vibration level in the cabin, and through that an improved comfort for crew and passengers. The add-on system does not effect the above mentioned specific function of the synchrophase system itself.

A propeller blade position control system to reduce the vibrations and noise in the cabin as much as possible is disclosed in U.S. Pat. No. 5,150,855 assigned to the Assignee of the present patent. In the system described in U.S. Pat. No. 5,150,855, during adjustment of the predetermined relative phase angle, i.e. the phase angle between the propeller blades of one propeller and corresponding propeller blades of another propeller (or other propellers), by the synchrophase system the propeller blades of one propeller are accelerated or decelerated in order to obtain a new phase relation between them and the propeller blades of another propeller (or other propellers). The new phase relation differs from the original one by $m.(2\pi/n)$ radians. This system is very effective under most conditions, but it would be desirable to provide means to accommodate localized disturbances affecting the propellers unequally. For example, during adjusting or already before during the measurement procedure to establish an optimum relative phase angle, one of the propellers might be affected by atmospherical disturbances not affecting the other propeller (or propellers) in the same way. Such disturbances might introduce an uncontrolled acceleration or deceleration of one propeller with respect to another propeller (or the other propellers). Without additional measures the vibration level detecting means and the control unit may have difficulty establishing a new relationship after the disturbance occurred. In other words, it is difficult to detect the exact additional relative phase shift caused by the disturbance. After an entire measurement procedure the relative phase shift ought to be substantially $2\pi$ radians, however, the disturbance might have caused in the particular circumstances of unequal, localized disturbances, an unknown additional relative phase shift. Therefore, establishing the optimum relative phase angle may be difficult.

SUMMARY OF THE INVENTION

It is an object of the present invention to provide an improved system for managing the rotation of multiple propellers of an aircraft, for example to reduce vibrations in the cabin of the aircraft, which system can accommodate localized unequal influences on the dynamic behavior of the individual propellers.

Accordingly, in one aspect the invention provides a system for reducing vibrations in a cabin of an aircraft driven by two or more propellers each having n blades (n being an integer equal or larger than 2), and having a relative, adjustable phase angle, the system comprising:

synchrophase means for adjusting the relative phase angle such that a predetermined relative phase angle may be maintained;

vibration level detecting means to supply information about a vibration level at one or more positions within the cabin or information related thereto, and to generate a corresponding vibration level signal, and a control unit supplying an error signal to the synchrophase means in response to the vibration level signal causing the synchrophase means to adjust the predetermined relative phase angle to a new relative phase angle causing a reduced vibration level, the new relative phase angle differing $m.(2\pi/n)$ radians (m being an integer) from the predetermined relative phase angle and wherein each propeller comprises at least one recognising means attached to one propeller blade, each recognising means being detectable by a respective sensor connected to the control unit to send a detection signal to the control unit upon passing of the recognising means past the respective sensor.

By these measures the absolute positions of the blades of the various propellers may always be calculated by the control unit. Any additional phase shift caused by uncontrolled atmospheric disturbances can, therefore, be detected. Knowledge about such an additional phase shift is especially useful if it occurs during a phase adjustment procedure since the procedure may be stopped and restarted.

In another aspect the invention provides a system for controlling the dynamic behavior of the propellers of an an aircraft driven by one or more propellers having at least two propeller blades, said system comprising:

a) a control system for controlling the dynamic behavior of said propeller or propellers independently;

b) for each of said propellers, at least one recognizing mark identifying one propeller blade and distinguising said one propeller blade from other blades on said each propeller; and e) a respective sensor for detecting each said recognizing mark, said sensor being connected to said control system to send a blade detection signal to said control unit upon passing of said recognizing mark past each said respective sensor;

whereby said blade detection signal can be used to control said propeller or propellers according to the detected position of said recognizably marked blade.

Preferably, in the system according to the invention, in order to establish a desired relative phase angle, the vibration level detecting means supplies information about the actual vibration level to the control unit at successive measuring times after the synchrophase means has established between arbitrary blades of each propeller a predetermined relative phase angle $\phi_0$ and the control system has measured the first momentary relative angle $\phi_1$ between those blades to which the recognizing means are related, wherein $\phi_1=x1.(2\pi/n)$ and x1 is an integer $\leq n$. After having measured the vibration level for a first initial phase angle value $(\phi_0+\phi_1)$ the control system forces the synchrophase means to shift the propeller blades to successive relative phase angles of $[\phi_0+\phi_1+m_1.(2\pi/n)]$, in which $m_1$ is an integer $\leq n$, whereby the control unit receives the detection signals from each respective sensor in order to establish whether at any of the measuring times the maintaining of the first initial phase angle value $[\phi_0+\phi_1]$ is disturbed, and if so, to stop measuring the vibration level and to stop shifting the propeller blades to the successive relative phase angles.

Such a stop is ended when the synchrophase means has succeeded to re-establish a predetermined relative phase angle $\phi_0$ between arbitrary blades followed by measuring by the control system of a second momentary relative angle $\phi_2$ between those blades to which the recognizing means are related. After such a stop there is a second initial relative phase angle $\phi_0+\phi_2$. Again, in order to establish a desired relative phase angle, the vibration level detecting means supplies information about the actual vibration level to the control unit at successive measuring times after the synchrophase means has shifted the propeller blades to successive relative phase angles of $[\phi_0+\phi_2+m2.(2\pi/n)]$, in which $\phi_2=x2.(2\pi/n)$ and m2 is an integer $\leq n$, whereby the control unit receives the detection signals from each respective sensor in order to establish whether at any of the measuring times the second initial relative phase angle $\phi_0+\phi_2$ is disturbed and, if so, to stop measuring the vibration level and to stop shifting the propeller blades to the successive relative phase angles.

The control unit may compare the information, which corresponds to an actual vibration value, with a prefixed reference vibration value, determining therefrom an optimum combination between the blades of the various propellers, and supplying a control signal to the synchrophase means in the case of a substantial difference in value between the reference value and the actual vibration value.

If measuring the vibration level and shifting the propeller blades to the successive relative phase angles is not stopped the control unit determines from the information delivered by the vibration level detecting means a combination between the blades of the various propellers causing a minimum vibration value, and supplying a control signal to the synchrophase means to adjust the predetermined relative phase angle to a new relative phase angle corresponding to the minimum vibration value.

The vibration level detecting means comprises a number of vibration level sensors all supplying vibration level data to the control unit, which analyses the vibration level data according to a predetermined algorithm.

The system according to the invention offers the possibility to phase lock both propellers such that not only a predetermined phase relation is maintained between the propeller blades of both propellers in general, but more specifically a predetermined phase relation is maintained between a particular blade of one propeller and a particular blade of another propeller.

BRIEF DESCRIPTION OF THE DRAWINGS

The invention will be described in more detail in the following part of the description wherein reference is made to the attached drawings.

FIG. 2 is a block diagram showing in more detail than FIG. 1 an embodiment of a propeller synchrophase system according to the invention.

FIG. 3 illustrates schematically the possible angular position combinations of two 6-blade propellers in which the same phase relation between the propeller blades in general is maintained.

DETAILED DESCRIPTION OF THE EMBODIMENTS

Figure 1:
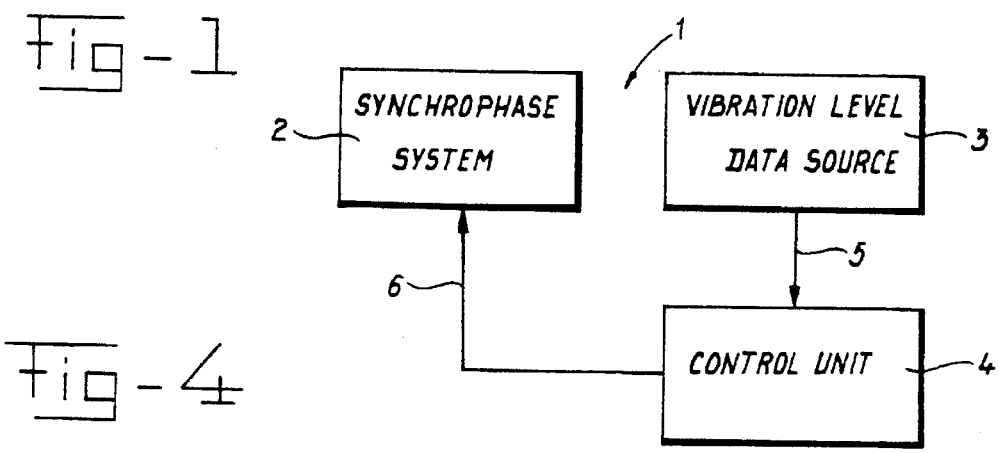
FIG. 1 is a block diagram illustrating the elements of a propeller blade position regulator according to the present invention.

As shown in FIG. 1 the propeller blade position control system 1 consists of a conventional synchrophase system 2, a source of vibration level data 3, providing vibration level data about one or more positions of the aircraft structure, and a control unit 4. The vibration level data source may comprise one or more transducers or pick-ups and a device or devices to amplify the amplitude or level of the vibration signal. The sensed signals of the measuring equipment are supplied via line 5 to the control unit 4. The unit 4 analyses the signals in agreement with one of a number of possible algorithms, some of which will be described in more detail.

If for instance the signal exceeds a predetermined level during a predetermined time period, the control unit 4 generates a command signal which is led through line 6 to the synchrophase system. The system 2 will change the existing combination of blades which are synchrophased whereby a momentary out-of-phase position of the propellers shall be as short as possible.

In other embodiments the vibration level data source comprises a memory in which information is stored about the particular angular phase relation of both propellers which results into a minimum vibration level in the cabin. Specific examples of both types of embodiments will be explained hereinafter.

FIG. 2 illustrates schematically a propeller blade position controller according to the invention, destined for a twin-propeller aircraft. To indicate the correspondence between the general block diagram in FIG. 1 and the more detailed block diagram in FIG. 2 the main sections illustrated in FIG. 1 are again illustrated in dashed lines in FIG. 2.

In FIG. 2 the engines 11 and 21 are connected to the respective propellers 12 and 22 through their hydromechanical propeller blade pitch control mechanisms which are separately indicated by 13 and 23. The rotational speed of each engine-propeller combination is controlled by a controller indicated with reference numbers 14 and 24 respectively. Both controllers 14 and 24 receive an input signal RPM from the terminal 19 representing the desired nominal number of revolutions per minute to which the propellers should be adjusted. The blade passing frequency is registered by the detectors 15 and 25 respectively. Both detectors deliver their signals to the respective controllers 14 and 24 in which these signals are compared with the ROM-signal and in which, if necessary, control signals are generated to be supplied to the respective blade pitch control mechanisms 13 and 23. Further both detectors deliver their signals to a phase comparator 16. If there is a measurable difference in phase angle between both propellers, the comparator 16 generates a phase difference dependent signal which is supplied to a processor 17. The processor 17 receives furthermore a phase offset signal from terminal 20. If the measured phase difference deviates from the value given by the phase offset input 20, a conditioned error signal is delivered to the speed controller 24. The speed controller 24 will respond to the error signal and will cause a momentary increase or decrease in the speed of propeller 22 such that the phase difference of the signals measured by the detectors 15 and 25 is adjusted to the offset value received on terminal 20. The RPM-signal on terminal 19 and the phase offset-signal φ-offset on terminal 20 are generated by other systems in the aircraft as is known to the expert.

The components 11–25 of the synchrophase system described so far are in fact completely known from the prior art. Further details about the functioning of this part of the system can be found in the above mentioned publications.

The system illustrated in FIG. 2 comprises furthermore within the dashed frame 3 a number of vibration detectors 30, 31, 32 and 33 destined to measure the vibration level at different positions in the cabin of the airplane. (The actual number of detectors can be selected by the user). The signals generated by these vibration detectors are supplied to a processor 34 in which the received signals are processed according to a predetermined algorithm. The processor 34 has the same function as the control unit 4 in FIG. 1. If the processor 34 decides that the momentary angular position combination of the blades of both propellers still results in a general vibration level in the cabin above a predetermined reference level, then the processor 34 will supply a control signal to the processor 17 causing the processor to provide a signal to the controller 24. The controller 24 will respond to the signal and will cause a momentary increase or decrease in the speed of propeller 22 such that the propellers will become phase locked in another angular position combination.

FIG. 3 illustrates the various angular position combinations of the two propellers whereby the same mutual phase relationship is maintained. Each propeller has six blades and one of the blades, blade 40 of propeller 1 and blade 41 of propeller 2, is shaded in FIG. 3 and will act as reference blade. It will be clear from FIG. 3 that in each of the six possible angular position combinations both propellers have the same phase relation although, if the blades are considered as different individual components, the six illustrated combinations are different. All prior art synchrophase systems try to maintain a predetermined phase relation between both propellers without looking at the individual blades of the propellers. The system according to the underlying invention however takes the individual blades into account. In other words, the prior art systems try to maintain a predetermined phase angle $\phi_0$ between the propeller blades whereby $0<\phi_0<2\pi/n$ (n being the number of blades), whereas the herein described system will try to maintain the same predetermined phase angle $\phi_0$ between selected propeller blades.

Figure 4:
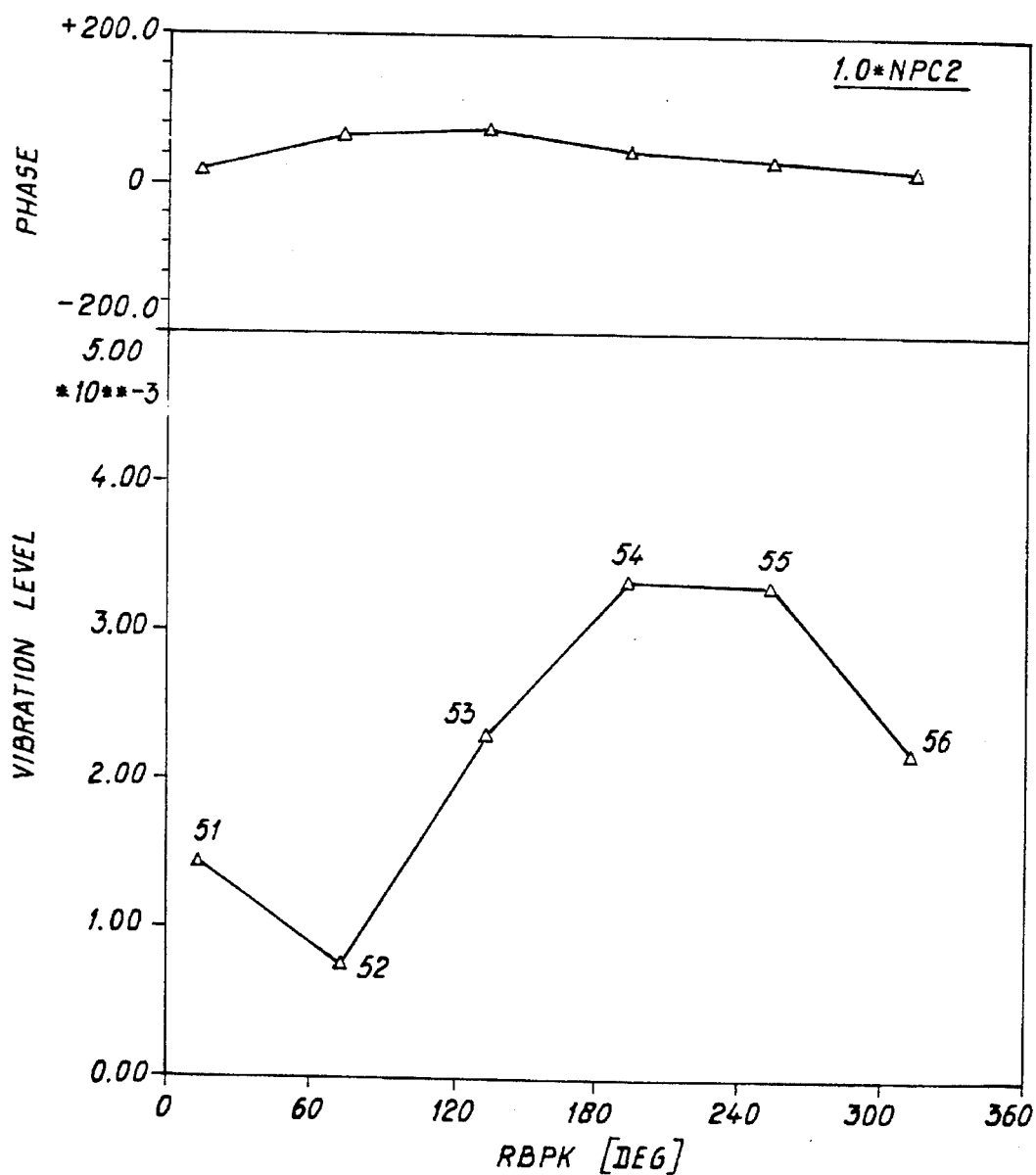
FIG. 4 shows a schematic curve of the change of the vibration level of a hard point in the cabin as function of the six successive blade combinations of two six-blade propellers.

The advantages of the system according to the invention can be made clear with reference to FIG. 4 which shows an example of a recording of the vibration level measured with a sensor at a location at the seat rail in the floor of the cabin of the Fokker 50 which was used for the experiments. As already indicated above the Fokker 50 has two 6-blade propellers and as explained above a predetermined phase angle between both propellers can be maintained with six different angular position combinations of the blades of both propellers. Shown is the relation between the vibration level and the six combinations between the blades of the first propeller and the blades of the second propeller. The six combinations are indicated by reference numbers 51–56 in FIG. 3 and the same reference numbers are used in FIG. 4. The recording shows a minimum level for the preferable blade combination 52 and a maximum level for combinations 54 and 55.

A practical embodiment of the system according to the invention may operate as follows. After the synchrophase subsystem 2 has reached a phase lock situation wherein both propellers are locked in anyone of the six possible combinations the measuring circuit 3 starts measuring the vibration level. The measured vibration level data is stored in a memory in the processor 34 and the processor generates thereafter a control signal to shift the position of the blades of the controlled propeller $2\pi/n$ radians (=360/n degrees) with respect to the other propeller. Again the vibration level is measured and stored in the memory of the processor 34 whereafter a further control signal will be applied to the processor 17 to cause a further $2\pi/n$ radians shift of the propeller blades. In this way the vibration level is measured for all six propeller blade combinations. Based on the stored data the processor 34 finally generates the ultimate control signal causing a phase shift of $m(2\pi/n)$ radians whereby m is selected by the processor 34 between 0 and 5 such that the combination with minimum vibration level (combination 52 in the above example) will be selected and maintained.

In the above described example it is more or less assumed that only one vibration level sensor was active within the vibration level data source 3. In practical embodiments, however, a number of sensors will be installed within the cabin and the signals delivered by those sensors will be combined according to a predetermined algorithm. In the example illustrated in FIG. 2 there are 4 sensors which are preferably installed at various representative locations within the cabin. It is for instance possible to determine the sum or the average of the various signals, which sum or average is used in the processor 34 as criterium to decide on. However, it is also possible to use a priority scheme in which the signal from predetermined sensors are given a higher weight than the signals from other sensors. The development of suitable algorithms for processing a number of signals derived from various sensors is considered within reach of the expert in this field.

In another embodiment of the invention the system is engaged as soon as after the take-off of the aircraft the synchrophase system is activated. The processor 34 in control unit 4 compares the sensed momentary vibration level in the cabin with a prefixed reference value. In case there is a substantial difference in value, the processor 34 presents a command signal proportional to $2\pi/n$ radians (360/n degrees) to the processor 17. In reaction the synchrophase system will change the speed of propeller 22 by fining the blade pitch, such that the position of the blades of that propeller will be shifted 360/n degrees with respect to the blades of the other propeller 12. The time the shift will take is mainly determined by the size and the weight of the propeller. When the standard phase off-set between the propellers is re-adjusted and the vibration level in the cabin is not yet equal or below the prefixed reference value, the described action by the processor 34 is repeated until the first blade combination for which the vibration level in the cabin is equal or below the maximum level is established.

Figure 5:
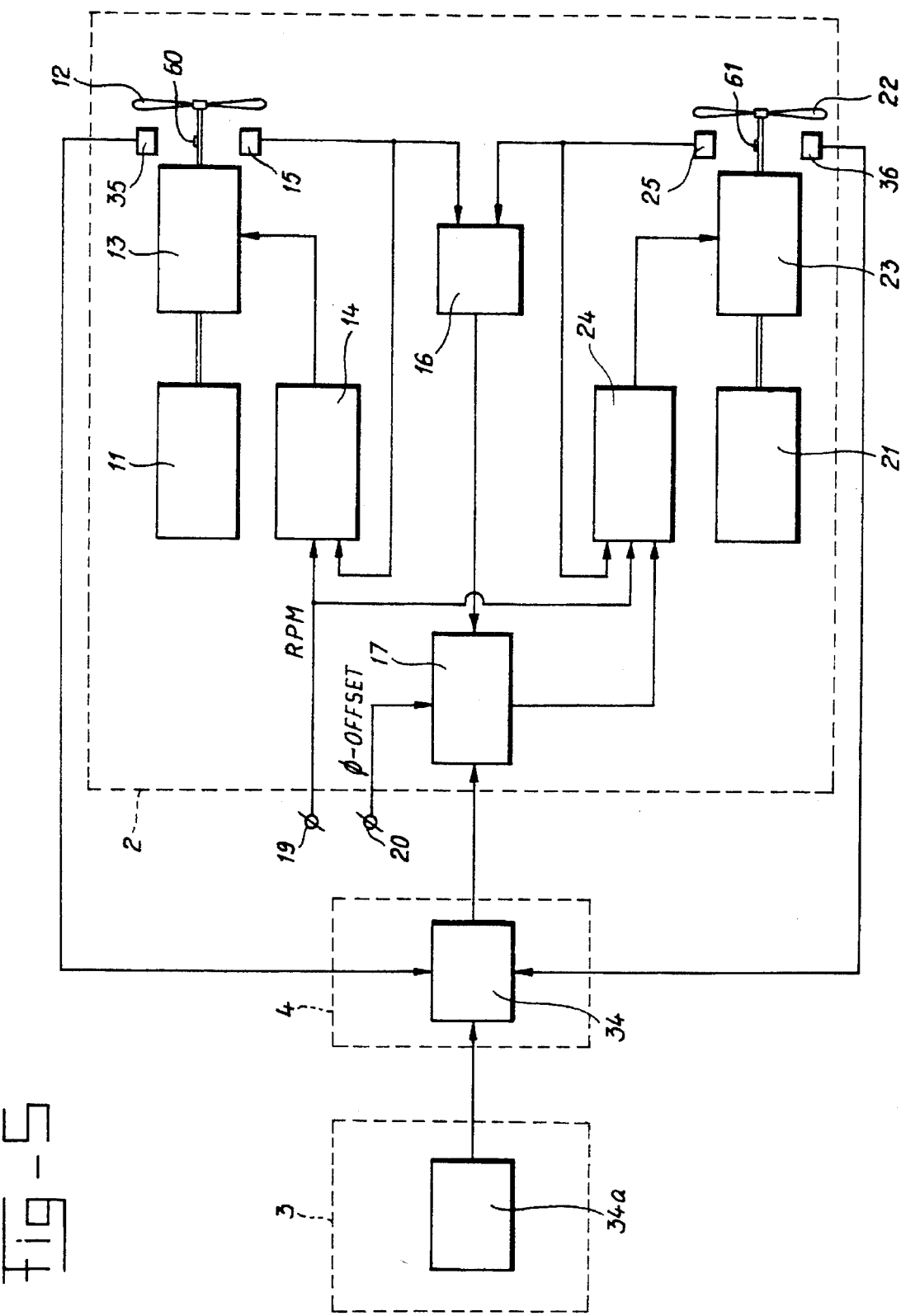
FIG. 5 is a block diagram showing in more detail than FIG. 1 another embodiment of a similar phase system according to the invention.

In yet another embodiment of the invention, which is separately illustrated in FIG. 5, the processor 34 is coupled to a memory 34a in which the combination of the position of propeller blades is stored which gives an minimum vibration and noise level. The respective information can be obtained for instance in the above described manner during a test flight. Furthermore the system comprises two additional sensors 35 and 36 destined to detect the actual position of the reference blades 40 and 41 respectively. Both sensors supply a signal to the processor 34. As soon as the synchrophase system has reached a stable condition in which propeller 22 is phase locked to propeller 12 the processor 34 determines which of the six possible angular propeller blade combinations is momentarily selected by the synchrophase system. This is done by evaluating the signals received from the additional sensors 35 and 36. Thereafter the processor 34 calculates the difference angle between the momentary combination and the preferred combination and generates a corresponding error signal to the processor 17 causing the synchrophase system to lock both propellers in the preferred combination. Dependent on the actual calculated phase difference the error signal may result either into a momentary decrease or in a momentary increase of the rotational speed of propeller 22 to reach the preferred combination. In the case the control unit finds that the vibration and noise level in the cabin exceeds the level for comfort, a command signal is calculated which shifts the position of one propeller with respect to the other propeller at one go from the "uncomfort position" to the "comfort position".

In yet a further embodiment of the invention the add-on system is engaged as soon as after the take-off of the aircraft the synchrophase system is activated. The control unit 4 determines the combination of blades for minimum vibration level in the cabin and measures the vibration level for all other combinations. An alert limit is calculated from the average of the maximum and the minimum value and the minimum value. The next step of the control unit is to generate a first command signal to the synchrophase system if the momentary vibration level is above the alert limit. Upon the first command signal, the synchrophase system shall shift the blade combination to the combination for minimum vibration. Hereafter the control unit continuously compares the measured, momentary vibration level with the alert limit. If this limit is exceeded, a second command signal is generated. And so on. The control unit will verify from time to time whether the selected blade combination for minimum vibration level still provides the minimum vibration level. If this is no longer the case, the unit will repeat the selection procedure for the best blade combination.

An experimental embodiment of the above described blade matching system was tested in an Fokker 50 series aircraft. This test system had facilities to operate in three different modes, i.e. a step by step mode, a continuous mode, and an auto minimum mode. Before the system starts functioning in one of the selected modes the system checks first of all if the number of revolution per minutes of both propellers (the Fokker 50 series aircraft has two propellers) are within a predetermined window, which window is specific for cruise flight conditions. Thereafter the cockpit crew selects one of the above mentioned modes with the following result:

1) Step by step mode. By selecting this mode the system is instructed to carry out a one blade shift operation. After a predetermined stabilization period (of for instance 10 seconds) the propellers are stable in their new mutual relation and if necessary the crew may operate the system once more to carry out a further blade shift operation.

2) Continuous mode. In this mode the crew has the possibility to start a sequential blade shift operation whereby with predetermined intervals of for instance 30 seconds a blade shift operation is carried out. This continuous mode is for instance useful for measuring the vibration level at the different relative phase angles and accumulating the respective measured values in a memory for further use.

3) The auto minimum mode. In this mode a number of sequential steps are carried out:
  1. First of all the system checks if the number of revolutions per minute is within the predetermined window, which window is representative for normal cruise conditions. If this is true then step 2 is carried out.
  2. The system waits for a predetermined period of for instance 10 seconds to be sure that the propellers have stabilized.
  3. With predetermined intervals of for instance 10 seconds the vibration level is measured at predetermined different positions in the cabin of the airplane. The measured values are stored in a memory.
  4. After three samples measured in step 3. the average vibration level is calculated and the calculated results are stored in a memory.
  5. If the average vibration level, calculated in step 4. is above a predetermined threshold level then step 6. is carried out. Otherwise the process goes back to step 3.
  6. With predetermined time intervals a number of blade phase shift instructions is provided to the system to carry out an equal number of blade shift operations. The length of the above mentioned time intervals is sufficient to provide for a first interval section in which the actual blade shifting is carried out, a second interval section in which the engines are enabled to stabilize and a third interval in which the various samples are measured from which an average value is calculated.
  7. The calculated average sample values are stored in a memory. Altogether values are stored for each of the different relative phase angles.
  8. The minimum of all stored average values is calculated.
  9. A number of blade phase shift operations is carried out, the number being selected such that the propellers are adjusted to such a phase angle that the minimum vibration level, calculated in step 8., is obtained.
  10. With predetermined time intervals of for instance 10 seconds the vibration level is sampled.
  11. The average value of three samples taken in step 10. is calculated.
  12. a. If the average value, calculated in step 11. is smaller than or equal to a first limit value then the process switches back to step 10.
    b. If the average value, calculated in step 11. exceeds the minimum level calculated in step 8. with a predetermined tolerance value then the process switches back to step 6.
    c. If the calculated average value is larger than a second threshold value after a predetermined time interval of for instance 5 minutes, then the process switches back to step 6.
    d. If the average value calculated in step 8. is larger than a further limit value after a further time interval of for instance 15 minutes then the process switches back to step 6.
  13. Go to step 10.

During adjusting the predetermined relative phase angle, i.e. the phase angle between the propeller blades of one propeller and corresponding propeller blades of another propeller (or other propellers), by the synchrophase system 2 the propeller blades of one propeller are accelerated or decelerated in order to obtain a new phase relation between them and the propeller blades of another propeller (or other propellers). The new phase relation differs from the original one by $m.(2\pi/n)$ radians as defined above. However, during adjusting or already during the measurement procedure to establish an optimum relative phase angle, one of the propellers might be affected by atmospherical disturbances not affecting the other propeller (or propellers) in the same way. Such disturbances might introduce an uncontrolled acceleration or deceleration of one propeller with respect to another propeller (or the other propellers). Without additional measures the vibration level detecting means 3 and the control unit 4 cannot establish the new relationship after the disturbance occurred. In other words, it is impossible to detect the exact additional relative positive or negative phase shift caused by the disturbance. After an entire measurement procedure the relative phase shift ought to be substantially $2\pi$ radians, however, the disturbance might have caused an unknown additional relative phase shift. Therefore, establishing the optimum relative phase angle will not be possible.

To solve this problem additional measures are taken. In a first embodiment of the invention to solve this problem, the position of one blade of each propeller is established by recognition marks 60, 61, as is schematically depicted in FIGS. 3 and 5. The recognition marks 60, 61 are preferably fixed on or near to the propeller axis and they add a negligible weight to the propeller (FIG. 5).

The recognition marks 60, 61 may be made of any detectable material, e.g. magnetic material or might consist of a specific pattern on a propeller shaft or propeller back plate (FIG. 3) which is detectable by optical means.

The recognition mark 60, respectively 61 is preferably detected by the sensor 35, respectively 36, whenever the propeller blade to which the recognition means 60, respectively 61 is attached passes the sensor 35, respectively 36. The sensor 35, respectively 36 supplies a detection signal to the processor 34. By means of usual algorithms then the processor can establish the absolute angles of the propeller blades of both propeller 12 and propeller 22 with respect to some reference line.

Suppose initially, i.e. before any adjustment procedure, the predetermined relative phase relation is $\phi_0$. This initial phase angle $\phi_0$ is set and maintained by the synchrophase system 2 and may, for instance, be 7°. During the adjustment procedure the system collects vibration levels at relative phase shifts of $m.(2\pi/n)$ for any $m=1, \ldots, n$ relative to the initial predetermined relative phase angle. If at some measuring time corresponding to a relative phase shift of $m_1.(2\pi/n)$, in which $m_1$ is an integer, the processor 34 detects that the actual relative phase angle does not equal $\phi_1=\phi_0+m_1.(2\pi/n)$ the adjustment procedure is stopped since then atmospheric or other disturbances will have caused an uncontrolled and undesired additional positive or negative phase shift. The adjustment procedure will be stopped until the synchrophase means have established a new predetermined relative phase angle of $\phi_2=\phi_0+m_2.(2\pi/n)$, in which $m_2$ is an integer. The adjustment procedure will be restarted at this new predetermined relative phase angle $\phi_2$. Again during the adjustment procedure at any measuring time corresponding to a relative phase shift of $m_3.(2\pi/n)$ ($m_3$ being an integer) the processor 34 detects the actual relative phase angles and checks whether the actual relative phase angle equals $\phi_2+m_3.(2\pi/n)$. If after all measurements at relative phase angles $m=1, \ldots, n$ the equation still holds the optimum relative phase relation will be established and the propeller blades will accordingly be set. If not, the adjustment procedure will restart again.

Instead of stopping the adjustment procedure after an atmospheric or other disturbance and running an entire adjustment procedure again, i.e. measuring vibration levels for all relative phase angles $\phi_0+m.(2\pi/n)$ in which $m=1, \ldots, n$, an alternative continuation of the adjustment procedure may be carried out in which the vibration levels already measured before the atmospheric disturbance occurred and stored in the system memory are taken into account. This may shorten the measuring procedure since measurement data already available is not collected again.

The advantage of this second embodiment is especially manifest in an embodiment of the invention in which the collection of measurement data is not stopped after one measurement cycle, but is continued in order to obtain several vibration levels for each predetermined relative phase angle $\phi=\phi_0+m.(2\pi/n)$, in which $m=1, \ldots n$, and to select the optimum predetermined relative angle $\phi$ based on averaging these several vibration levels. The table below shows an example of the adjustment procedure based on this alternative embodiment.

Example:

| | | | | |
|---|---|---|---|---|
| RUN 1 | starting at: $\phi_1$ = angle between the measured blades = $(\phi_0 + 120)°$ between the marked blades | | | |
| START | x = 2, | m = 6. | $\phi_1 = \phi_0 + 120°$. | Vibration level: A |
| shift 1 | x = 2, | m = 1. | $\phi_1 = \phi_0 + 180°$. | Vibration level: B |
| shift 2 | x = 2, | m = 2. | $\phi_1 = \phi_0 + 240°$. | Vibration level: C |
| shift 3 | x = 2, | m = 3. | $\phi_1 = \phi_0 + 300°$. | Vibration level: D |
| shift 4 | x = 2, | m = 4. | $\phi_1 = \phi_0 + 0°$. | Vibration level: E |
| shift 5 | x = 2, | m = 5. | $\phi_1 = \phi_0 + 60°$. | Vibration level: F |
| shift 6 | x = 2, | m = 6. | $\phi_1 = \phi_0 + 120°$. | Vibration level: A |
| shift 7 | x = 2, | m = 1. | $\phi_1 = \phi_0 + 180°$. | Vibration level: B |
| RUN 2 | starting at: $\phi_2$ = angle between the measured blades = $(\phi_0 + 240)°$ between the marked blades after a first unpurposely blade shift of, for example, 60° | | | |
| RE-START | x = 4, | m = 6. | $\phi_2 = \phi_0 + 240°$. | Vibration level: C |
| shift 8 | x = 4, | m = 1. | $\phi_2 = \phi_0 + 300°$. | Vibration level: D |
| shift 9 | x = 4, | m = 2. | $\phi_2 = \phi_0 + 0°$. | Vibration level: E |
| shift 10 | x = 4, | m = 3. | $\phi_2 = \phi_0 + 60°$. | Vibration level: F |
| shift 11 | x = 4, | m = 4. | $\phi_2 = \phi_0 + 120°$. | Vibration level: A |
| RUN 3 | starting at: $\phi_3$ = angle between the measured blades = $(\phi_0 + 240)°$ between the marked blades after a second unpurposely blade shift of, for example, 120° | | | |
| RE-START | x = 4, | m = 6. | $\phi_3 = \phi_0 + 240°$. | Vibration level: C |
| shift 12 | x = 4, | m = 1. | $\phi_3 = \phi_0 + 300°$. | Vibration level: D |
| shift 13 | x = 4, | m = 2. | $\phi_3 = \phi_0 + 0°$. | Vibration level: E |

END of adjustment procedure.

In the table "x" corresponds to the value of m related to the actual absolute phase angle between the two marked propeller blades of a two propeller airplane (e.g. the Fokker 50) at the start or restart of an adjustment procedure. After shift 7 the system detects that without supplying any control signal the relative phase angle is shifted through an additional 60° because of some disturbance. The collection of data is stopped until the system has established the new actual absolute phase angle between the two marked propeller blades, so that the measured vibration level data can be related to the correct phase angle and accordingly stored in the system memory. Then, the adjustment procedure is continued.

After shift 11 a second undesired additional phase shift of 120° is observed. The procedure is stopped again until the new absolute phase angle between the two marked propeller blades is established.

After shift 13 the procedure is stopped and the data collected is averaged for each phase angle $\phi$, and the phase angle showing the least average vibration level is selected. Of course, stopping after shift 13 is just an example. The system can also collect data for much more measurement points.

Although above various embodiments are described in which it is assumed that the aircraft has two propellers it will be clear that the invention can be applied also in case another number of propellers is used. In general the inventive system can be applied to an aircraft having j propellers each comprising n blades. The number of possible angular position combinations can be expressed in general as $n^{j-1}$. For an aircraft with four 6-blade propellers the number of possible combinations would be $6^3=216$. In such a case it would be very time consuming to measure the vibration level for each of these combinations. Therefore it is preferable under those circumstances to use an embodiment in which the momentary position of all propellers is detected and compared with the desired preferred combination which is stored in a memory whereafter calculated error signals are supplied to the controller of the synchrophase system to lock each propeller in the preferred combination.

I claim:

1. A system for reducing vibrations in the cabin of an aircraft driven by two or more propellers each having n blades, n being an integer equal to or larger than 2, and having a relative, adjustable phase angle between one and another of a pair of said propellers, said system comprising:

a) a synchrophase system for adjusting said relative phase angle such that a predetermined relative phase angle is maintained;

b) a vibration-level detector to supply vibration level related information from one or more positions within said cabin, and to generate a corresponding vibration level signal;

c) a control unit for supplying an error signal to said synchrophase system in response to said vibration level said error signal causing said synchrophase means to adjust an initial predetermined relative phase angle to a new predetermined relative phase angle providing a reduced vibration level, said new relative phase angle differing by $m.(2\pi/n)$ radians (m being an integer) from said initial predetermined relative phase angle;

d) for each said propeller of said pair of propellers, at least one recognizing mark identifying one propeller blade and distinguising said one propeller blade from other blades on said each propeller; and e) a respective sensor for detecting each said recognizing mark, said sensor being connected to said control unit to send a blade detection signal to said control unit upon passing of said recognizing mark past each said respective sensor;

whereby said blade detection signal can be used to relate said predetermined relative phase angles to an absolute phase angle between said one propeller blades of said pair of propellers distinguished by one said recognizing mark.

2. A system according to claim 1, which is arranged to carry out an adjustment procedure in order to establish a desired relative phase angle, wherein said vibration level detecting means are arranged to supply information about the actual vibration level to said control unit at successive measuring times after the synchrophase means has shifted the propeller blades to successive relative phase angles of $\phi_0+m.(2\pi/n)$, in which $\phi_0$=an initial predetermined relative phase angle set by the synchrophase means and m is an integer $\leq n$ and wherein said control unit is arranged to store said information about the actual vibration level and to receive said detection signals from each respective sensor in order to establish whether at any of said measuring times the relative phase angle as set is disturbed and, if so, to interrupt measuring said vibration level and to interrupt shifting the propeller blades to said successive relative phase angles and to start a new adjustment procedure.

3. A system according to claim 1, which is arranged to carry out an adjustment procedure in order to establish a desired relative phase angle, wherein said vibration level detecting means are arranged to supply information about the actual vibration level to said control unit at successive measuring times after the synchrophase means has shifted the propeller blades to successive relative phase angles of $\phi_0+m.(2\pi/n)$, in which $\phi_0$=an initial predetermined relative phase angle set by the synchrophase means and m is an integer and wherein said control unit is arranged to store said information about the actual vibration level and to average measured vibration level data for each individual phase angle, and is arranged to receive said detection signals from each respective sensor in order to establish whether at any of said measuring times the relative phase angle as set is disturbed and, if so, to interrupt measuring said vibration level and to interrupt shifting the propeller blades to said successive relative phase angles and to restart the adjustment procedure while using vibration level data already collected.

4. A system according to claim 1, wherein said control unit compares said information, which corresponds to an actual vibration value, with a prefixed reference vibration value, determining therefrom an optimum combination between the blades of the various propellers, and supplying a control signal to said synchrophase means in the case of a substantial difference in value between the said reference value and the actual vibration value.

5. A system according to claim 2, wherein if measuring said vibration level and shifting the propeller blades to said successive relative phase angles is not stopped said control unit determines from said information delivered by said vibration level detecting means a combination between the blades of the various propellers causing a minimum vibration value, and supplying a control signal to said synchrophase means to adjust the predetermined relative phase angle to a new relative phase angle corresponding to said minimum vibration value.

6. A system according to claim 3, wherein if measuring said vibration level and shifting the propeller blades to said successive relative phase angles is not stopped said control unit determines from said information delivered by said vibration level detecting means a combination between the blades of the various propellers causing a minimum vibration value, and supplying a control signal to said synchrophase means to adjust the predetermined relative phase angle to a new relative phase angle corresponding to said minimum vibration value.

7. A system according to claim 1, wherein said vibration level detecting means comprises a number of vibration level sensors all supplying vibration level data to said control unit, which analyses said vibration level data according to a predetermined algorithm.

8. A system according to claim 1 wherein each recognizing mark is located on a propeller shaft.

9. A system according to claim 1 wherein each recognizing mark is located on a propeller back plate.

10. A system for controlling the dynamic behavior of the propellers of an an aircraft driven by one or more propellers having at least two propeller blades, said system comprising:

a) a control system for controlling the dynamic behavior of said propeller or propellers independently;

b) for each of said propellers, at least one recognizing mark identifying one propeller blade and distinguising said one propeller blade from other blades on said each propeller; and e) a respective sensor for detecting each said recognizing mark, said sensor being connected to said control system to send a blade detection signal to said control unit upon passing of said recognizing mark past each said respective sensor;

whereby said blade detection signal can be used to control said propeller or propellers according to the detected position of said recognizably marked blade.

* * * * *